(12) United States Patent
Kodaira

(10) Patent No.: US 10,088,310 B2
(45) Date of Patent: Oct. 2, 2018

(54) TILT DETECTING DEVICE

(71) Applicant: Kabushiki Kaisha TOPCON, Tokyo-to (JP)

(72) Inventor: Jun-ichi Kodaira, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 407 days.

(21) Appl. No.: 14/950,517

(22) Filed: Nov. 24, 2015

(65) Prior Publication Data

US 2016/0161253 A1 Jun. 9, 2016

(30) Foreign Application Priority Data

Dec. 9, 2014 (JP) ................................ 2014-248631

(51) Int. Cl.
| | |
|---|---|
| *G01C 9/06* | (2006.01) |
| *G01C 9/20* | (2006.01) |
| *G01C 9/08* | (2006.01) |
| *G01C 9/18* | (2006.01) |

(52) U.S. Cl.
CPC ............... *G01C 9/06* (2013.01); *G01C 9/08* (2013.01); *G01C 9/18* (2013.01); *G01C 9/20* (2013.01); *G01C 2009/066* (2013.01)

(58) Field of Classification Search
CPC ... G01C 9/06; G01C 9/08; G01C 9/18; G01C 9/20; G01C 2009/066
See application file for complete search history.

(56) References Cited

U.S. PATENT DOCUMENTS

| | | | | |
|---|---|---|---|---|
| 4,590,680 A | * | 5/1986 | Hanchett et al. ........ | G01C 9/20 33/366.16 |
| 5,371,951 A | * | 12/1994 | Piske ...................... | G01C 9/06 33/366.12 |
| 5,893,215 A | | 4/1999 | Kumagai et al. | |
| 6,137,568 A | | 10/2000 | Ohtomo et al. | |
| 6,473,714 B1 | * | 10/2002 | Kumagai ................ | G01C 9/06 356/445 |
| 2009/0002690 A1 | * | 1/2009 | Glimm ................... | G01B 11/26 356/139.1 |

(Continued)

FOREIGN PATENT DOCUMENTS

| | | |
|---|---|---|
| EP | 1772703 A2 | 4/2007 |
| JP | 11-51652 A | 2/1999 |
| JP | 2000-266545 A | 9/2000 |

OTHER PUBLICATIONS

European communication dated May 4, 2016 in corresponding European patent application No. 15195559.8.

*Primary Examiner* — Eric L Bolda
(74) *Attorney, Agent, or Firm* — Nields, Lemack & Frame, LLC

(57) ABSTRACT

A tilt detecting device comprising, a light source for projecting a pattern, a liquid component having a free liquid surface and for rear-surface reflecting by the free liquid surface, a photodetection element for photodetecting a reflection image of the rear-surface reflected pattern, and an arithmetic processing unit, wherein the arithmetic processing unit is adapted to scan a predetermined range of a photodetection surface of the photodetection element as many times as required and performs averaging processing to a photodetection signal as detected and calculates a barycentric position of the pattern based on signals subjected to averaging processing.

13 Claims, 4 Drawing Sheets

(56) References Cited

U.S. PATENT DOCUMENTS

| | | | | |
|---|---|---|---|---|
| 2011/0001986 A1* | 1/2011 | Westermark | ........... | G01N 21/55 |
| | | | | 356/615 |
| 2012/0180564 A1* | 7/2012 | Ohtomo | ................ | G01F 23/292 |
| | | | | 73/293 |
| 2016/0061595 A1* | 8/2016 | Nishita et al. | ......... | G01B 11/26 |
| | | | | 356/152.2 |

* cited by examiner

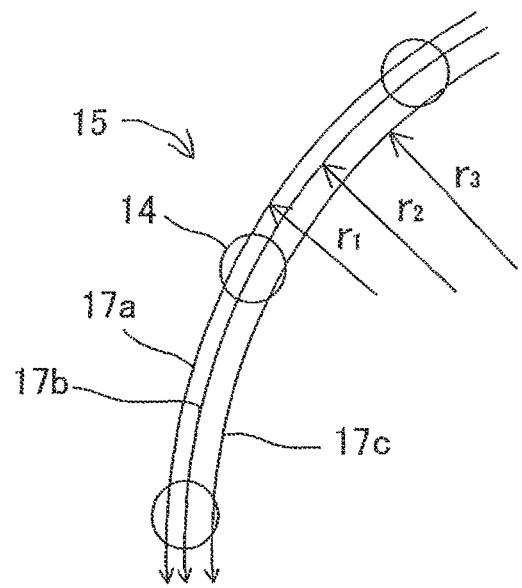
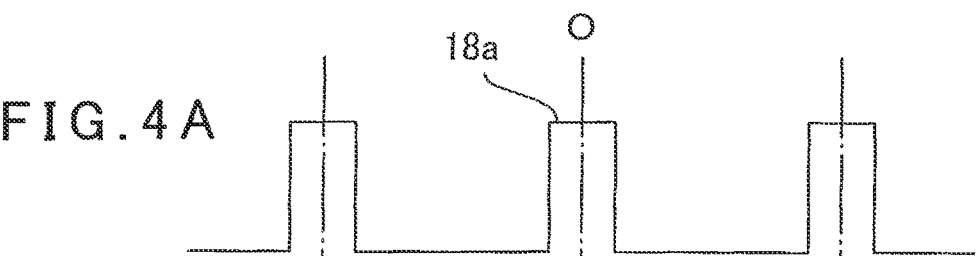
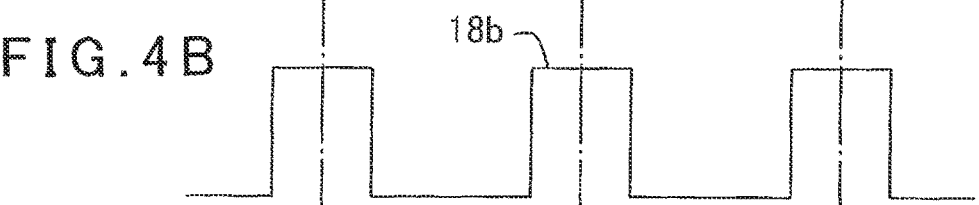
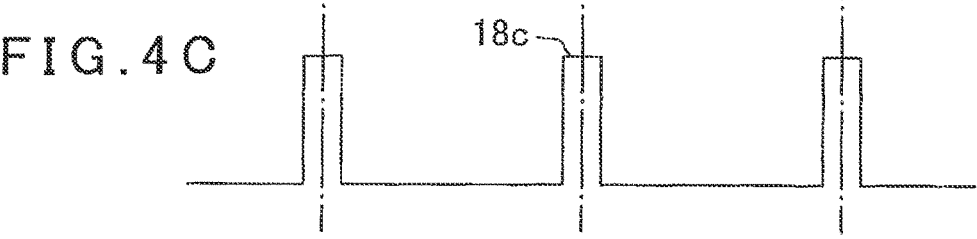

TILT DETECTING DEVICE

BACKGROUND OF THE INVENTION

The present invention relates to a tilt detecting device capable of stably detecting tilt and horizontality.

As a device for detecting the horizontality and the tilt, a tilt sensor, for instance, is known and as conventional tilt sensors and the following two types can be cited.

A first one is a device where a liquid is sealed in a container so that a free liquid surface is formed, an absolute pattern is projected by a telecentric optical system to a liquid surface of the liquid, and a reflection image of the absolute pattern obtained by a rear-surface reflection on the liquid is projected to a photodetection element.

In the case of the sensor described above, since the liquid surface of the liquid is horizontal at all times, when the sensor is tilted, a reflection image projected to the photodetection element moves, and by detecting an amount of moving of the reflection image, the tilt of the sensor is detected.

As the liquid sealed in the container, an oil with viscosity or the like is used so that recognition of the absolute pattern can be performed normally even under vibrating, and the absolute pattern can be stably recognized by damping of the oil. However, since the viscosity of the oil rises under a low temperature, in order to detect the tilt under a low-temperature environment, there is a problem that follow-up properties deteriorate.

Further, a second one is a device where an image of penetrating type circular bubble tube is projected to an element split in four parts and the tilt of the sensor is detected from changes of light amount. In the case of the second sensor, since a light quantity difference caused by a shade of air bubbles is seen, a displacement by vibrating can be processed by averaging, and as the liquid to be sealed in the bubble tube, alcohol with a low viscosity or the like is used.

However, in the case of the sensor described above, since a movement of the air bubbles directly depend on an accuracy of a glass inner surface, a range where the movement of the air bubbles follows up the tilt of the sensor with the good sensitivity is limited. Further, an influence by a deformation of the air bubbles caused by a temperature change can be easily applied, and there is a problem that an offset at a zero point is difficult.

SUMMARY OF THE INVENTION

It is an object of the present invention is to provide a tilt detecting device capable of stably detecting the tilt and the horizontality without being affected by an environmental temperature and a photodetecting condition of a photodetection element.

To attain the object as described above, a tilt detecting device according to the present invention comprises a light source for projecting a pattern, a liquid component having a free liquid surface and for rear-surface reflecting by the free liquid surface, a photodetection element for photodetecting a reflection image of the rear-surface reflected pattern, and an arithmetic processing unit, wherein the arithmetic processing unit is adapted to scan a predetermined range of a photodetection surface of the photodetection element as many times as required and performs averaging processing to a photodetection signal as detected and calculates a barycentric position of the pattern based on signals subjected to averaging processing.

Further, in the tilt detecting device according to the present invention, the arithmetic processing unit scans circularly around a point set in advance as a center on the photodetection element.

Further, in the tilt detecting device according to the present invention, the arithmetic processing unit scans around a barycenter, as a center, obtained by a calculation with different radiuses, respectively.

Further, in the tilt detecting device according to the present invention, the pattern comprises at least two small patterns disposed point-symmetrically with respect to the barycenter of the pattern.

Further, in the tilt detecting device according to the present invention, the arithmetic processing unit obtains respectively width centers of the two small patterns by averaging processing and calculates the barycentric position of the pattern based on a straight line connecting the width centers of the two small patterns.

Further, in the tilt detecting device according to the present invention, the arithmetic processing unit obtains the width center of the small patterns for each of two sets of the two small patterns disposed point-symmetrically, calculates the straight line connecting the width centers of the two small patterns for each set, and calculates an intersection of two straight lines as the barycentric position.

Further, in the tilt detecting device according to the present invention, the pattern comprises at least one small pattern, a center of the small pattern is located at a known position with respect to the barycenter of the pattern, a center position of the small pattern is calculated based on a photodetection signal in scanning, and the barycentric position of the pattern is calculated based on the center position of the small pattern.

Furthermore, in the tilt detecting device according to the present invention, the arithmetic processing unit scans on the photodetection element in an X-direction and in a Y-direction, acquires photodetection signals of respective rows, which the pixels belong to, in the X-direction and in the Y-direction, detects the pattern, and calculates the barycentric position of the pattern.

According to the present invention, a tilt detecting device comprises a light source for projecting a pattern, a liquid component having a free liquid surface and for rear-surface reflecting by the free liquid surface, a photodetection element for photodetecting a reflection image of the rear-surface reflected pattern, and an arithmetic processing unit, wherein the arithmetic processing unit is adapted to scan a predetermined range of a photodetection surface of the photodetection element as many times as required and performs averaging processing to a photodetection signal as detected and calculates a barycentric position of the pattern based on signals subjected to averaging processing. As a result, as the liquid component, alcohol or the like which is a liquid with low viscosity dependence on a temperature and relatively low viscosity can be used so that a follow-up properties do not deteriorate even under a low-temperature environment, and the tilt and the horizontality can be stably detected without being affected by the environmental temperature or a projecting condition to the photodetection element.

Further, according to the present invention, in the tilt detecting device, the arithmetic processing unit scans circularly around a point set in advance as a center on the photodetection element. As a result, the arithmetic processing unit can calculate an approximate position of the barycenter of the pattern.

Further, according to the present invention, in the tilt detecting device, the arithmetic processing unit scans around a barycenter, as a center, obtained by a calculation with different radiuses, respectively. As a result, even in a case where there is an individual different in responsiveness or the like of each pixel of the photodetection element, an error caused by the individual difference can be suppressed, and the calculation accuracy of the barycentric position of the pattern can be improved.

Further, according to the present invention, in the tilt detecting device, the pattern comprises at least two small patterns disposed point-symmetrically with respect to the barycenter of the pattern. As a result, the barycentric position of the pattern can be easily calculated.

Further, according to the present invention, in the tilt detecting device, the arithmetic processing unit obtains respectively width centers of the two small patterns by averaging processing and calculates the barycentric position of the pattern based on a straight line connecting the width centers of the two small patterns. As a result, even in a case where there is vibration from outside, the barycentric position of the pattern can be calculated with accuracy.

Further, according to the present invention, in the tilt detecting device, the arithmetic processing unit obtains the width center of the small pattern for each of two sets of the two small patterns disposed point-symmetrically, calculates the straight line connecting the width centers of the two small patterns for each set, and calculates an intersection of two straight lines as the barycentric position. As a result, even in a case where there is the vibration from the outside, the barycentric position of the pattern can be calculated, with more accuracy.

Further, according to the present invention, in the tilt detecting device, the pattern comprises at least one small pattern, a center of the small pattern is located at a known position with respect to the barycenter of the pattern, a center position of the small pattern is calculated based on a photodetection signal in scanning, and the barycentric position of the pattern is calculated based on the center position of the small pattern. As a result, the barycentric position of the pattern can be calculated only by scanning the one small pattern.

Furthermore, according to the present invention, in the tilt detecting device, the arithmetic processing unit scans on the photodetection element in an X-direction and in a Y-direction, acquires photodetection signals of respective rows, which the pixels belong to, in the X-direction and in the Y-direction, detects the pattern, and calculates the barycentric position of the pattern. As a result, the barycenter of the pattern can be calculated regardless of a shape of the pattern.

BRIEF DESCRIPTION OF THE DRAWINGS

FIG. 3 is a drawing to explain a scanning condition of a small pattern.

FIG. 4A to FIG. 4C are drawings to show rectangular waves obtained by scanning on each scan line.

DETAILED DESCRIPTION OF THE PREFERRED EMBODIMENT

A Description will be given below in embodiments of the present invention by referring to the attached drawings.

Figure 1:
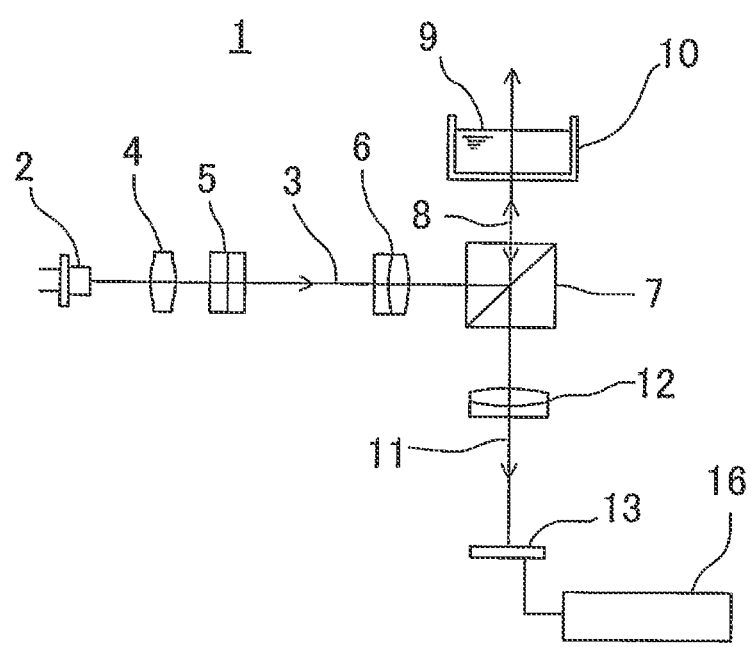
FIG. 1 is a block diagram to show a tilt detecting device according to an embodiment of the present invention.

First, in FIG. 1, a description will be given on a tilt detecting device 1 according to an embodiment of the present invention.

There is provided a light source 2, for instance an LED, for emitting a light beam in a horizontal direction. On a projecting optical axis 3 of the light source 2, a first condenser lens 4, a pattern component 5, a second condenser lens 6, and a beam splitter 7 are arranged.

A liquid component 9 is disposed on a reflecting optical axis 8 of the beam splitter 7, and the liquid component 9 is contained in a container 10 so that a free liquid surface is formed. As a material of the liquid component 9, a liquid with a viscosity, of which is relatively small even under a low temperature is used, for instance, alcohol. The light source 2 and the free liquid surface of the liquid component 9 may be arranged at conjugate positions.

Figure 2A:
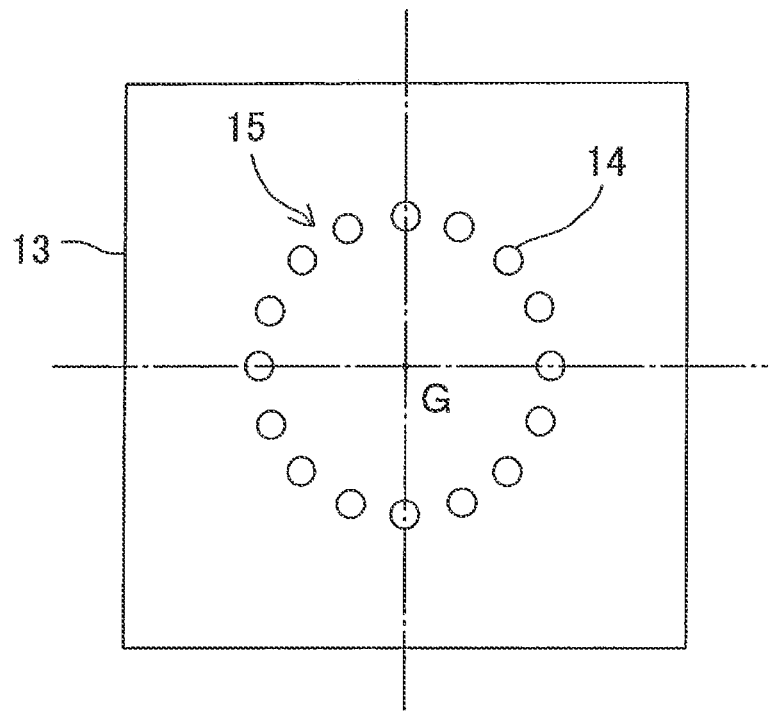
FIG. 2A is a case where a barycenter of a pattern projected to a photodetection element coincides a center of the photodetection element.
Figure 2B:
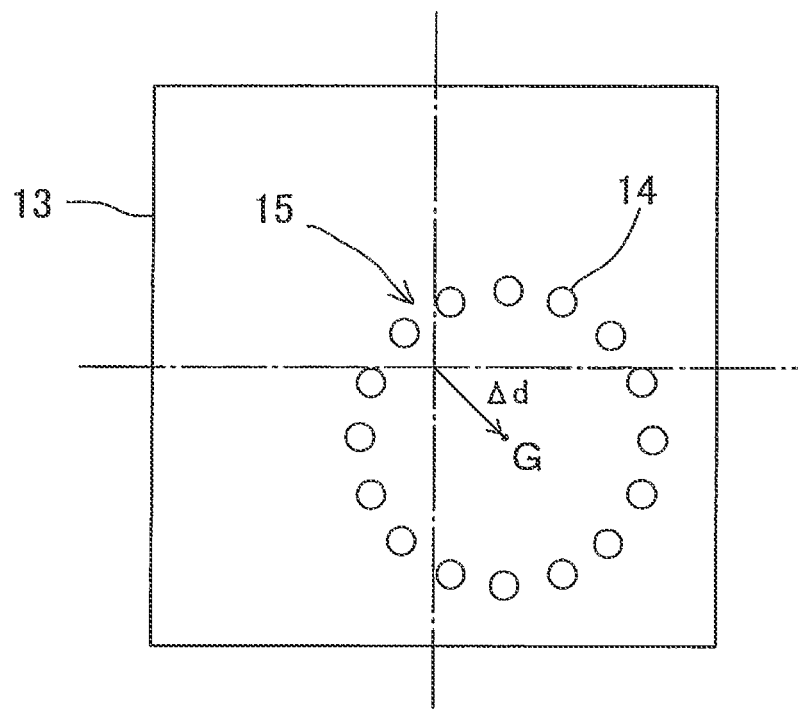
FIG. 2B is a drawing to show a case where the barycenter of the pattern is deviated from the center of the photodetection element.

The pattern component 5 is obtained by forming an opaque pattern in a transparent substrate or by punching a pattern in an opaque substrate. In the present embodiment, by punching circular holes at a predetermined angle pitch in a circumferential direction, as shown in FIG. 2A and FIG. 2B, a pattern 15 consisted of a plurality of circular small patterns 14 as arranged at the predetermined angle pitch is formed.

Although there may be at least two (one set) of the small patterns 14 disposed at point-symmetric positions with respect to a barycenter G of the pattern 15, there are preferably four (two sets) or more of the small patterns 14 disposed at point-symmetric positions with respect to the barycenter G of the pattern 15. It is to be noted that various kinds of arrangement of the small patterns 14 can be considered, and the drawing shows a case where the small patterns 14 is arranged at the predetermined angle pitch on the same circumference.

The light source 2, the first condenser lens 4, the pattern unit 5, the second condenser lens 6, the beam splitter 7 and the like, constitute a free liquid surface projecting optical system.

A laser beam emitted from the light source 2 and reflected by the beam splitter 7 is configured so as to be reflected by the free liquid surface of the liquid component 9 and to penetrate through the beam splitter 7. On a penetrating optical axis 11 of the beam splitter 7, a third, condenser lens 12, and a photodetection element 13 are disposed. As the photodetection element 13, a profile sensor which is an aggregate of pixels is used, for instance. The profile sensor can detect a position of a target in the profile sensor only by informations of respective rows, which the pixels belong to, in an X-direction and in a Y-direction without acquiring the informations of all the pixels. It is to be noted that as the photodetection element 13, a CCD or a CMOS sensor may be used.

The beam splitter 7, the third condenser lens 12, and the photodetection element 13 make up together a photodetecting optical system.

Further, the tilt detecting device 1 has an arithmetic processing unit 16. The penetrating optical axis 11 is an optical axis of a reflection light reflected on the free liquid surface of the liquid component 9, and in a case where the free liquid surface projecting optical axis is tilted, the free liquid surface of the liquid component 9 relatively tilts with respect to the free liquid surface projecting optical system. As a result, the reflecting optical axis 8 tilts with respect to the beam splitter 7, and further, the reflection light (the penetrating optical axis 11) at the beam splitter 7 angle-deflects with respect to the reflecting optical axis 8.

For this reason, a projecting position of the free liquid surface projecting optical system with respect to the photodetection element 13 changes. Based on a displacement of the projecting position on the photodetection element 13, tilt of the free liquid surface projecting optical system can be detected. The arithmetic processing unit 16 is designed so as to calculate the tilt of the free liquid surface of the liquid component 9 and a direction of the tilt based on an input signal photodetecting from the photodetection element 13.

The laser beam emitted from the light source 2 passes through the first condenser lens 4, the pattern component 5, the second condenser lens 6, and the beam splitter 7 and is incident to the liquid component 9, and the laser beam is reflected by the free liquid surface. The reflection light passes through the beam splitter 7 and the third condenser lens 12 and is projected to the photodetection element 13. That is, the pattern 15 is projected to the photodetection element 13.

In a case where the tilt detecting device 1 is horizontal, the position of the barycenter G of the pattern 15 coincides with a center of the photodetection element 13 or an origin point as offset in advance. In the present embodiment, as shown in FIG. 2A, the barycenter G of the pattern 15 coincides with the center of the photodetection element 13 (that is, a scanning center).

Further, in a case where the tilt detecting device 1 tilts, since the free liquid surface of the liquid component 9 keeps horizontal, an image of the pattern 15 on the liquid component 9 moves in proportion to a tilt angle. That is, as shown in FIG. 2B, the position of the barycenter G of the pattern 15 is projected to the position deviated from the center of the photodetection element 13.

Further, in a case where the tilt detecting device 1 vibrates, a state of the free liquid surface of the liquid component 9 is changed by vibrating, and a position or a shape of the image of the pattern 15 on the photodetection element 13 changes.

In the present embodiment, when a tilt detection is performed by the tilt detecting device 1, two processes, that is, a coarse tilt detection process and a precise tilt detection process are carried out.

In the coarse tilt detection process, first, a detection of the scanning center is performed. In the coarse tilt detection process, the arithmetic processing unit 16 performs scanning a point set in advance, for instance, the center of the photodetection element 13, as a center pattern (the scanning center) circularly. It is to be noted that the coarse tilt detection process, a scan radius is set to be the same as the radius of the pattern 15 and scanning is confined to plural times.

In a case where the tilt detecting device 1 is horizontal, as a result of the coarse tilt detection, detection signals are detected at an equal interval and an equal signal width in one cycle of scanning. Therefore, a barycenter of the total signals appearing in the one cycle of scanning coincides with the center pattern. That is, the barycenter G of the pattern 15 obtained from the detection signal coincides with the center pattern. Here, the barycenter of the total signals is obtained based on positions of the detection signals on a scan line 17 (see FIG. 3) which is a trajectory of scanning.

Further, in a case where the tilt detecting device 1 is tilted, as shown in FIG. 2B, the pattern 15 relatively moves with respect to the photodetection element 13, and the barycenter G of the pattern 15 is displaced from the center pattern by Δd.

When scanning is performed around the center pattern as a center under this condition, the scan line 17 only passes through a part of the small patterns 14 of the pattern 15. For instance, in the condition of FIG. 2B, when scanning is performed around the center of the photodetection element 13 as the center, the scan line 17 passes through the small pattern 14 in a lower right part in the figure but does not pass through the small pattern 14 in an upper left part.

Therefore, in a case where the barycenter of the detection signals on the scan line 17 is obtained, the barycenter is a position moved in a lower right direction from the center of the photodetection element 13. Next, the barycentric position obtained from the detection signals is set again as the center pattern, and the coarse tilt detection process is performed as described above.

By repeatedly carrying out the coarse tilt detection process, the center pattern can be made to approximately coincide with the barycenter G of the pattern 15. By approximately coinciding with the center pattern with the barycenter G of the pattern 15, the signals detecting all the small patterns 14 appears on the scan line 17.

When a condition where all the small patterns 14 are obtained, then, the precise tilt detection is carried out.

In the precise tilt detection process, the barycenter G of the pattern 15 obtained in the coarse tilt detection process is used as the center pattern, the photodetection element 13 is scanned circularly, and the photodetection signals from the pixel on the scan line 17 are detected. Further, scanning is performed concentrically by changing the radius (r1, r2, and r3 in FIG. 3) for each cycle of scanning. A range in a radial direction as performed scanning is up to the scan range where the small patterns 14 are completely included. Further, a change amount of the radius at each cycle is by the unit of one pixel of the photodetection element 13 or the unit of a required pixel.

When the scan line 17 passes through the small patterns 14, a rectangular wave having the detection signal 18 with a width equivalent to the small pattern 14 is detected. It is to be noted that in the present embodiment, scanning is configured so as to be performed about 40 to 50 times per second, for instance.

In the present embodiment, as shown in FIG. 3, the radius of the scan line 17 is changed, and required spots (three spots in FIG. 3) are scanned. Since the small pattern 14 has a circular shape, the rectangular waves detected by the arithmetic processing unit 16 become rectangular waves having the detection signals 18a to 18c with different widths as shown in FIG. 4A to FIG. 4C.

In FIG. 3, what is detected by a scan line 17a is a rectangular wave as shown in FIG. 4A, what is detected by a scan line 17b is a rectangular wave as shown in FIG. 4B, and what is detected by a scan line 17c is a rectangular wave as shown in FIG. 4C. The arithmetic processing unit 16 is configured so as to scan on each of the scan lines 17a to 17c as many as required, respectively.

Since the liquid component 9 is a liquid such as alcohol with the low viscosity, in a case where the tilt detecting device 1 vibrates due to vibration from outside, the liquid component 9 vibrates, the state of the free liquid surface is changed, and a position or a shape of a reflection image of the pattern 15 projected to the photodetection element 13 changes.

Figure 5:
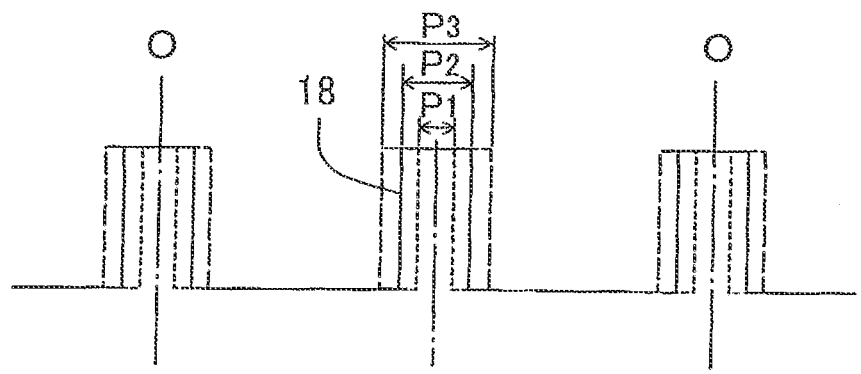
FIG. 5 is a drawings to explain a change of a width and a pitch of the rectangular waves caused by a change of a photodetecting condition on the photodetection element.

In a case where the position or the shape of the reflection image of the pattern 15 changes, as shown in FIG. 5, the width of the detection signal 18 detected by the arithmetic processing unit 16 changes to P1, P2, P3 or the like and the width of the rectangular wave changes.

Since scannings are performed on each of the scan lines 17a to 17c by a required number of times, respectively, by applying the averaging processing to the rectangular waves detected by the arithmetic processing unit 16, respectively, the change caused by vibrating of the liquid component 9 or the like is offset, and a center O of the width of each of the rectangular waves can be acquired.

Further, the arithmetic processing unit 16 obtains a pitch between the centers O of the width of each of the adjacent rectangular waves and can obtain the pitch between the small patterns 14 detected by averaging processing. Further, by obtaining a point where an obtained pitch between each of the small patterns 14 becomes an equal pitch, the barycenter G of the pattern 15 can be obtained.

It is to be noted that the center O of the width of each rectangular wave obtained by averaging processing is located on a straight line passing through the center of the small pattern 14 and the barycenter G of the pattern 15. Therefore, the position of the barycenter G of the pattern 15 may be obtained by obtaining the centers O of the widths of the small pattern 14 and the small pattern 14 at a point-symmetric position with respect to the small pattern 14 and by obtaining a midpoint of a line connecting the centers O of the widths to each other based on the detection signal on the same scanning line.

Further, in a case where there are two sets or more of the small patterns 14 which are point-symmetry with respect to the barycenter G of the pattern 15, the position of the barycenter G of the pattern 15 may be obtained by obtaining an intersection of the lines connecting the centers O of the widths of the small patterns 14 at point-symmetric positions. Further, based on a position of the rectangular wave on the scan line 17 and on a width of the rectangular wave, the barycenter may be obtained from a figure.

After the position of the barycenter G of the pattern 15 is obtained, the arithmetic processing unit 16 may calculate an amount of moving and a moving direction of the barycenter G of the pattern 15 with respect to the center of the photodetection element 13, that is, a change of the photodetection position on the photodetection element 13, detect the tilt of the tilt detecting device 1 based on the change of the photodetection position and perform leveling.

As described above, in the present embodiment, by scanning the reflection image of the pattern 15 projected to the photodetection element 13 circularly as many times as required and by applying the averaging processing to the obtained rectangular waves, the center O of the width of the small pattern 14 is obtained, and the position of the barycenter G of the pattern 15 is obtained from the width center O of the small pattern 14.

Thus, even in a case where the tilt detecting device 1 vibrates due to vibration from outside and the photodetecting condition of the photodetection element 13 is continuously changing, by appropriately selecting the number of scanning times, a variation caused by changing of the condition can be offset, and the width center O of the small pattern 14 and the position of the barycenter G of the pattern 15 can be obtained with precision.

Therefore, as the liquid component 9, the liquid such as alcohol or the like with relatively small change of the viscosity can be used. As a result, the follow-up properties of the liquid component 9 does not deteriorate even under the low-temperature environment, and the tilt and the horizontality of the tilt detecting device 1 can be stably detected without being affected by an environmental temperature.

Further, the tilt detecting device 1 projects the reflection image of the pattern 15 to the photodetection element 13 by a liquid rear-surface reflection by the liquid component 9. As a result, the deterioration of the follow-up properties of the liquid component 9 due to a fabrication accuracy of a glass can be suppressed.

Further, since scanning is performed on the scan lines 17 with different radiuses at required spots, even in a case where there is an individual difference in the responsiveness and the like of each pixel of the photodetection element 13, an error caused by the individual difference can be suppressed by averaging processing, and a calculation accuracy of the width center O of the small pattern 14 and the barycenter G of the pattern 15 can be improved and brought close to true values.

Further, by scanning the plurality of scan lines 17, it can be easily determined which position on the small pattern is scanned.

It is to be noted that in the present embodiment, although the projecting position of the pattern 15 on the photodetection element 13 is circularly scanned, by scanning the required range on the photodetection element 13 in the X-direct ion and in the Y-direction, by acquiring the informations of respective rows, which the pixels belong to, in the X-direction and the in Y-direction and by detecting the small pattern 14, the position of the barycenter G of the pattern 15 may be obtained.

Figure 6A:
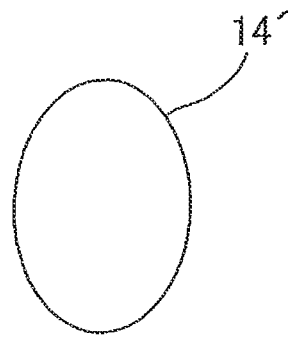
FIG. 6A and FIG. 6B are drawings to show other examples of the small pattern.
Figure 6B:
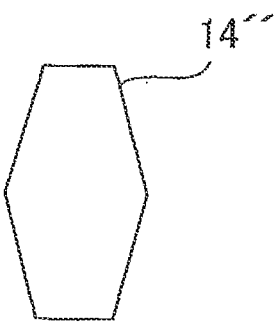

Further, in the present embodiment, although the shape of the small pattern 14 is set to the circular shape, the small pattern 14 may have any other shapes as long as the shape that can be disposed point-symmetrically such as an elliptical small pattern 14' as shown in FIG. 6A, a hexagonal small pattern 14" as shown in FIG. 6B and the like.

Further, in the present embodiment, although the pattern 15 is formed by disposing the small patterns 14 at the predetermined angle pitch in the circumferential direction, the pattern 15 may have another shape such as an elliptical shape, an even-number polygonal shape and the like as long as the shape that the small patterns 14 can be disposed point-symmetrically.

Further, in the present embodiment, in order to calculate the position of the barycenter G of the pattern 15, at least two small patterns 14 disposed at point-symmetric positions are used. The center of the small pattern 14 is positioned at a known position with respect to the barycenter of the pattern 15, and if, while scanning, it is possible to judge at which position the barycenter G of the pattern 15 is positioned with respect to the center of the small pattern 14, the small patterns 14 may be one.

The invention claimed is:

1. A tilt detecting device comprising, a light source for projecting a pattern, a liquid component having a free liquid surface and for rear-surface reflecting said pattern by said free liquid surface to form a rear-surface reflected pattern, a photodetection element for photodetecting a reflection image of said rear-surface reflected pattern, and an arithmetic processing unit, wherein said arithmetic processing unit is adapted to scan circularly around a point set in advance as a center on said photodetection element and scan a predetermined range of a photodetection surface of said photodetection element a plurality of times and performs averaging processing to a photodetection signal as detected and calculates a barycentric position of said pattern based on signals subjected to averaging processing.

2. A tilt detecting device according to claim 1, wherein said arithmetic processing unit scans around a barycenter, as a center, obtained by a calculation with different radiuses, respectively.

3. A tilt detecting device according to claim 2, wherein said pattern comprises at least two small patterns disposed point-symmetrically with respect to said barycenter of said pattern.

4. A tilt detecting device according to claim 3, wherein said arithmetic processing unit obtains respectively width centers of said two small patterns by averaging processing and calculates said barycentric position of said pattern based on a straight line connecting said width centers of said two small patterns.

5. A tilt detecting device according to claim 2, wherein said pattern comprises at least one small pattern, a center of said small pattern is located at a known position with respect to said barycenter of said pattern, a center position of said small pattern is calculated based on a photodetection signal in scanning, and said barycentric position of said pattern is calculated based on said center position of said small pattern.

6. A tilt detecting device according to claim 3, wherein said arithmetic processing unit obtains said width center of said small pattern for each of two sets of said two small patterns disposed point-symmetrically, calculates said straight line connecting said width centers of said two small patterns for each set, and calculates an intersection of two straight lines as said barycentric position.

7. A tilt detecting device according to claim 1, wherein said pattern comprises at least two small patterns disposed point-symmetrically with respect to said barycenter of said pattern.

8. A tilt detecting device according to claim 7, wherein said arithmetic processing unit obtains respectively width centers of said two small patterns by averaging processing and calculates said barycentric position of said pattern based on a straight line connecting said width centers of said two small patterns.

9. A tilt detecting device according to claim 7, wherein said arithmetic processing unit obtains said width center of said small pattern for each of two sets of said two small patterns disposed point-symmetrically, calculates said straight line connecting said width centers of said two small patterns for each set, and calculates an intersection of two straight lines as said barycentric position.

10. A tilt detecting device according to claim 1, wherein said pattern comprises at least one small pattern, a center of said small pattern is located at a known position with respect to said barycenter of said pattern, a center position of said small pattern is calculated based on a photodetection signal in scanning, and said barycentric position of said pattern is calculated based on said center position of said small pattern.

11. A tilt detecting device comprising, a light source for projecting a pattern, a liquid component having a free liquid surface and for rear-surface reflecting said pattern by said free liquid surface to form a rear-surface reflected pattern, a photodetection element for photodetecting a reflection image of said rear-surface reflected pattern, and an arithmetic processing unit, wherein said arithmetic processing unit is adapted to scan a predetermined range of a photodetection surface of said photodetection element a plurality of times and performs averaging processing to a photodetection signal as detected and calculates a barycentric position of said pattern based on signals subjected to averaging processing, and wherein said pattern comprises at least two small patterns disposed point-symmetrically with respect to said barycenter of said pattern.

12. A tilt detecting device according to claim 11, wherein said arithmetic processing unit obtains respectively width centers of said two small patterns by averaging processing and calculates said barycentric position of said pattern based on a straight line connecting said width centers of said two small patterns.

13. A tilt detecting device according to claim 11, wherein said arithmetic processing unit obtains said width center of said small pattern for each of two sets of said two small patterns disposed point-symmetrically, calculates said straight line connecting said width centers of said two small patterns for each set, and calculates an intersection of two straight lines as said barycentric position.

* * * * *